(12) United States Patent
Nehler et al.

(10) Patent No.: US 8,061,906 B2
(45) Date of Patent: Nov. 22, 2011

(54) FIBRE OPTIC DUPLEX CONNECTOR

(75) Inventors: Jürgen Nehler, Bad Nauheim (DE); Christoph Werner, Bischoffen (DE)

(73) Assignee: Euromicron Werkzeuge GmbH, Sinn-Fleisbach (DE)

( * ) Notice: Subject to any disclaimer, the term of this patent is extended or adjusted under 35 U.S.C. 154(b) by 0 days.

(21) Appl. No.: 12/669,325

(22) PCT Filed: Jul. 8, 2008

(86) PCT No.: PCT/EP2008/005559
§ 371 (c)(1),
(2), (4) Date: Apr. 13, 2010

(87) PCT Pub. No.: WO2009/010210
PCT Pub. Date: Jan. 22, 2009

(65) Prior Publication Data
US 2010/0254664 A1    Oct. 7, 2010

(30) Foreign Application Priority Data
Jul. 17, 2007   (DE) .......................... 10 2007 033 246

(51) Int. Cl.
*G02B 6/36* (2006.01)
(52) U.S. Cl. ................ 385/78; 385/53; 385/76; 385/77; 385/88; 385/92
(58) Field of Classification Search .................... 385/76, 385/77, 78, 88, 92, 53
See application file for complete search history.

(56) References Cited

U.S. PATENT DOCUMENTS

| | | | |
|---|---|---|---|
| 6,513,989 B1 * | 2/2003 | Bleck et al. | 385/60 |
| 2003/0219214 A1 | 11/2003 | Lee | |
| 2007/0025666 A1 | 2/2007 | Shibata | |
| 2010/0178010 A1 * | 7/2010 | Werner et al. | 385/65 |

FOREIGN PATENT DOCUMENTS

| | | |
|---|---|---|
| DE | 203 21 114 U1 | 2/2006 |
| EP | 1 092 997 A1 | 4/2001 |
| EP | 1 122 566 A2 | 8/2001 |
| EP | 1 199 587 A1 | 4/2002 |

OTHER PUBLICATIONS

International Search Report, dated Oct. 24, 2008.
International Preliminary Report of Patentability, mailed Feb. 18, 2010 (with English translation).

\* cited by examiner

*Primary Examiner* — Jennifer Doan
(74) *Attorney, Agent, or Firm* — RatnerPrestia

(57) ABSTRACT

Connector for the termination of optical transmission media including a connector housing and at least one connector inner part arranged therein, which includes a ferrule with a bore for receiving the optical transmission media, wherein the ferrule is arranged in the connector inner part so that it can be moved axially against the force of a spring, wherein the connector inner part is joined to the connector housing by a snap connection, wherein the connector housing has at least one opening into which a locking tab engages when in the installed position, wherein the locking tab is a triangular elevation, extending radially, in longitudinal section in axial direction, on a cylindrical part of the connector inner part.

7 Claims, 3 Drawing Sheets

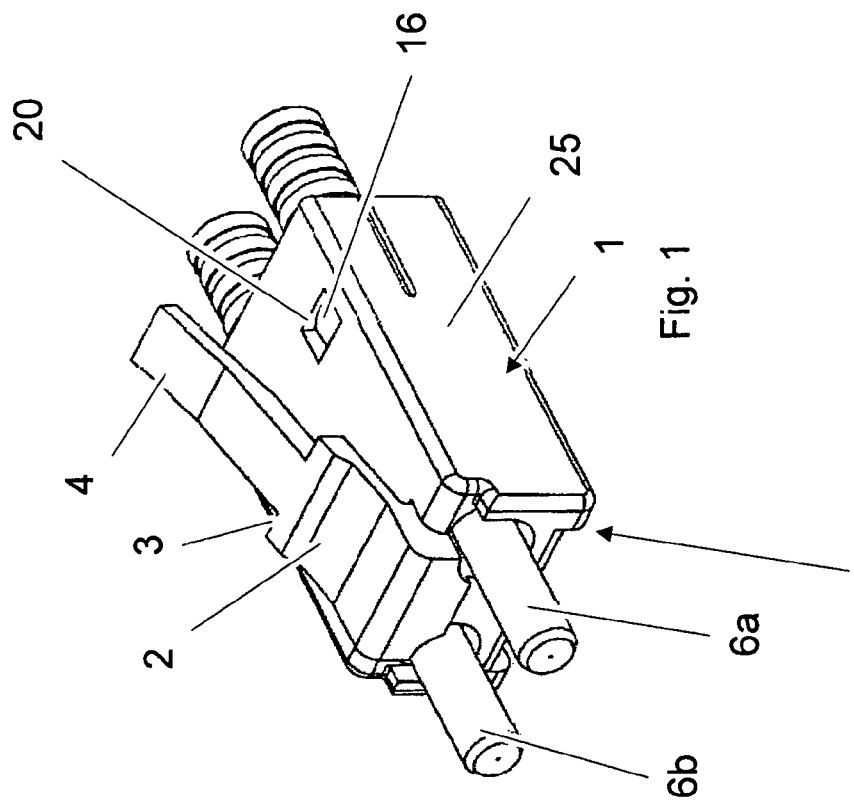
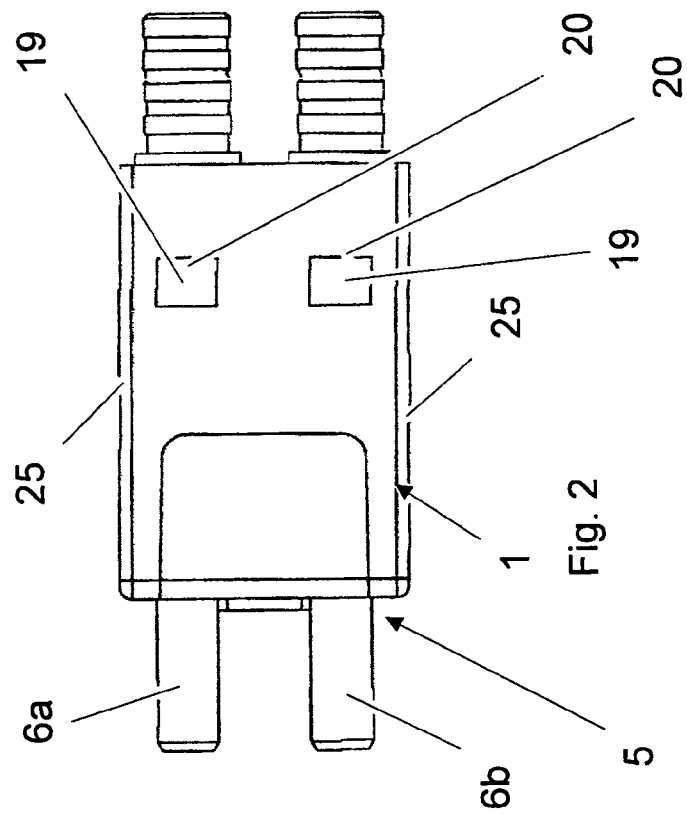

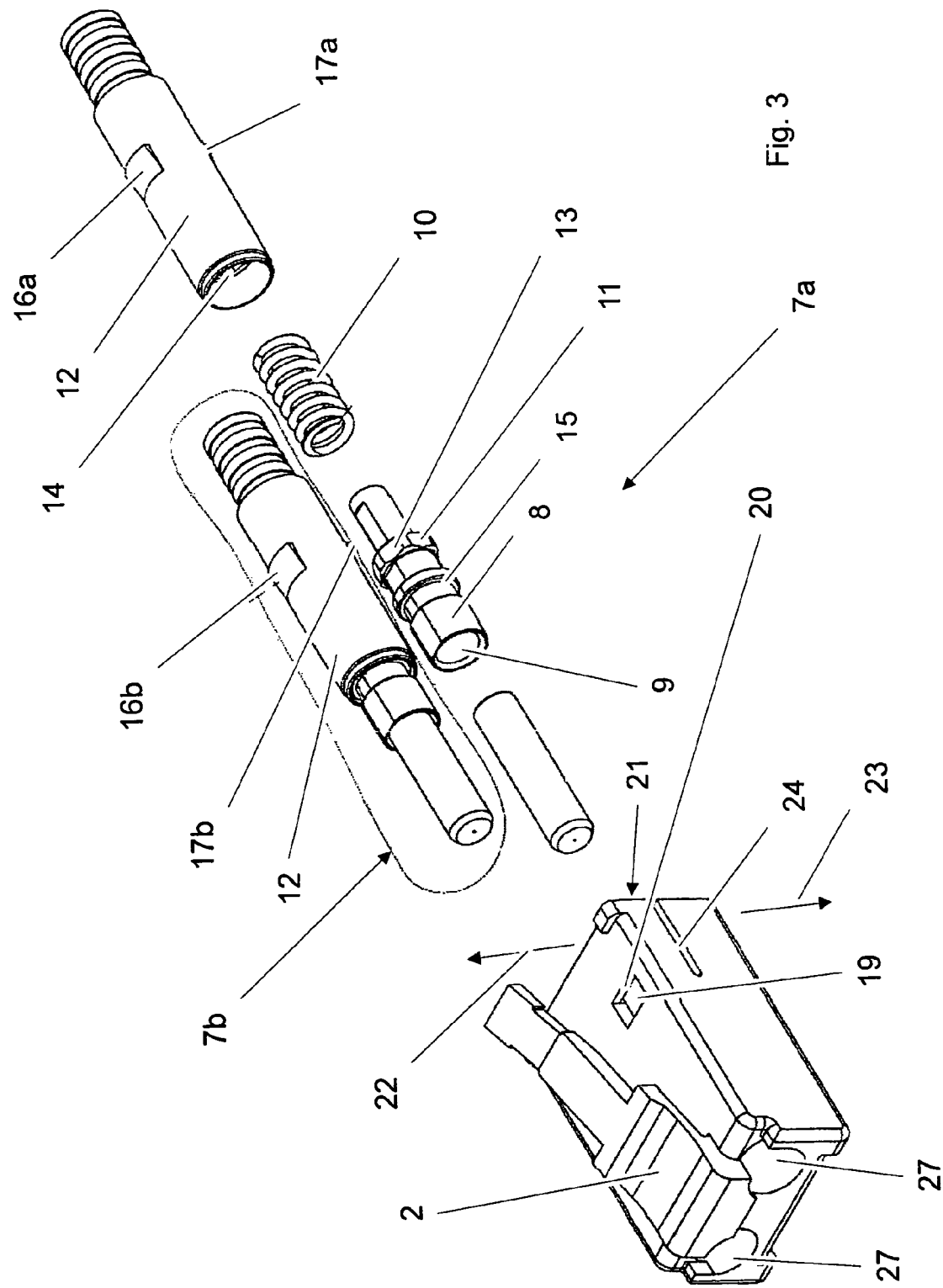

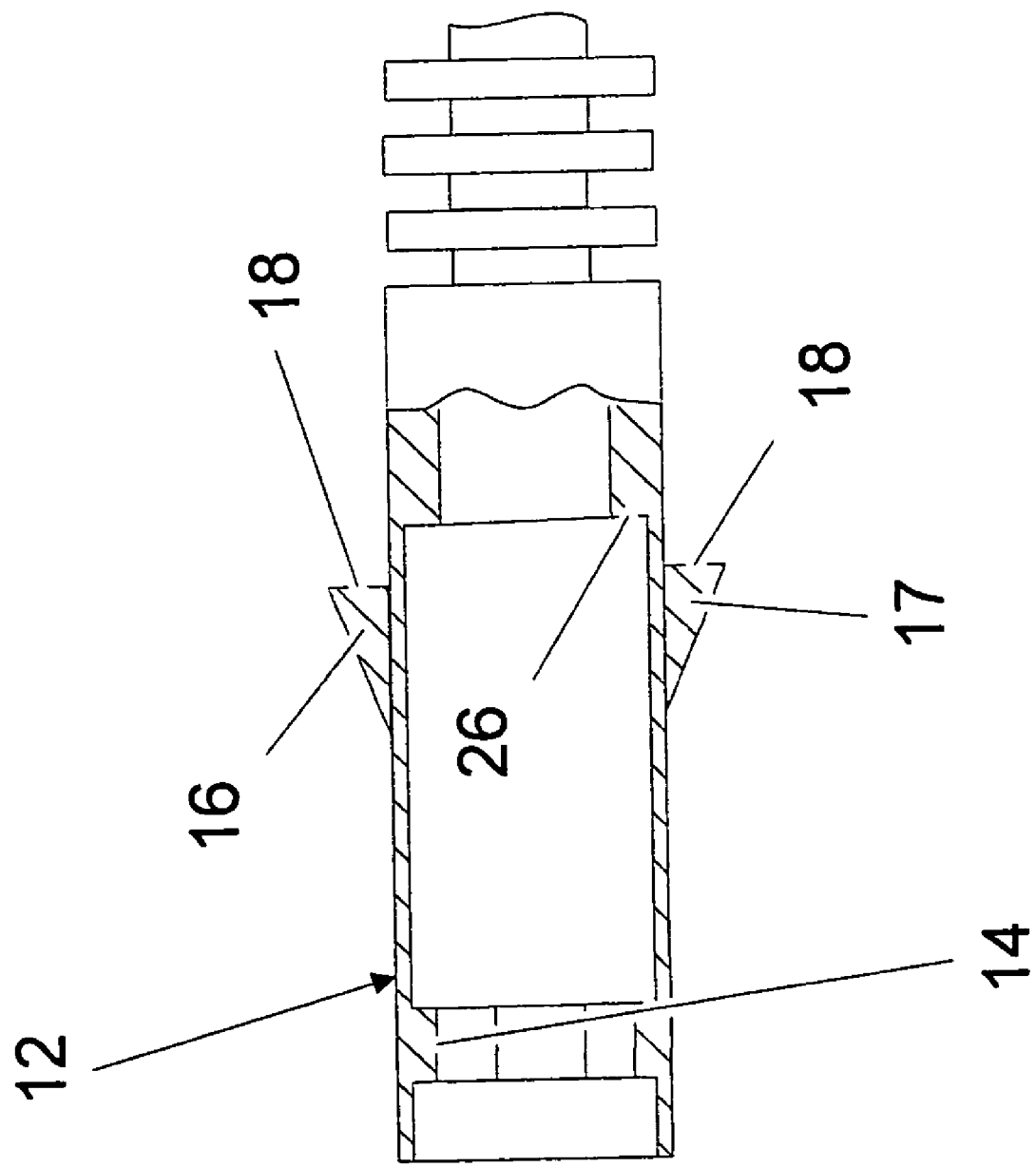

FIBRE OPTIC DUPLEX CONNECTOR

CROSS REFERENCE TO RELATED APPLICATIONS

This is a National Phase application of PCT application number PCT/EP2008/005559, filed Jul. 8, 2008, which claims priority benefit of German application number DE 10 2007 033 246.9, filed Jul. 17, 2007, the content of such applications being incorporated herein by reference.

FIELD OF THE INVENTION

The present invention relates to a connector for the termination of optical transmission media.

BACKGROUND OF THE INVENTION

To releasably join optical fibres together for example at the back of a device or at a feedthrough through a housing or a wall, connectors and/or receptacles that fit the connectors in the form of individual couplings, called receptacles in the case of optical fibres, are fitted into the ends of the optical fibres to be joined and fixed onto the optical fibres for example by clamping, shrink-fitting, gluing, casting or welding, with the result that light can then be reliably transmitted, by plugging connector and receptacle into each other, from an end face of one optical fibre into the end face of the opposite optical fibre.

To this end, ferrules, preferably made of a ceramic material, which are formed flat or convex at their end facing away from the optical fibre depending on the type of connection assembly, are usually arranged in each case in the connectors and the receptacles at the ends of the optical fibres, in order to ensure that the end-side coupling of light from one ferrule into the ferrule opposite it in the other connector or the other receptacle and arranged rotated by 180° relative to the first is without loss as far as possible and unsusceptible to scattered light. The ferrules serve to protect the ends of the optical fibres against wear and damage and serve to guide the optical fibres more easily, and in particular accurately, in the area of the connection assembly.

To ensure the better interchangeability of the connection cables, in most applications the optical fibre cables which comprise several individual optical fibres which, similar to a multiple wire, are each surrounded by their own casing in the cable sheathing, are made exclusively with connectors and appliance or wall connections are implemented with receptacles, wherein to create an optical connection between two optical fibre cables, for example for the purpose of extension, in each case the end faces, provided with a connector, of the optical fibres to be joined are plugged from opposite sides into a double coupling for optical connectors.

Such a connector usually consists of a housing into which an optical fibre cable is led at the rear side and in each case a ferrule, joined to an optical fibre, which projects from the connector on the end side opposite the rear side.

Connectors in RJ45 format are known for electrical connecting cables, wherein connectors of such dimensions are also increasingly used in optical fibres. The use of identical dimensions for electrical and optical connectors has the advantage that the optical fibres are compatible with electrical connections for example during installation, as these can be guided and laid for example through feed openings or cable shafts which are really intended for electrical cables.

Until now, generic connectors have been prefabricated in the state of the art, with the result that when joining the connector to the optical fibre only the optical fibre is pushed into the connector and glued to the ferrule. In the case of connectors which have a spring-loaded ferrule, this process is complicated insofar as it can here easily lead to a sticking of the parts that are movable towards each other.

SUMMARY OF THE INVENTION

It is therefore an object of the present invention to provide a connector which can be installed more easily.

This problem is solved by a connector for the termination of optical transmission media comprising a connector housing and at least one connector inner part arranged therein, which comprises a ferrule with a bore for receiving the optical transmission media, wherein the ferrule is arranged in the connector inner part so that it can be moved axially against the force of a spring, wherein the connector inner part is joined to the connector housing by means of a snap connection, wherein the connector housing has at least one opening into which a locking tab engages when in the installed position, wherein the locking tab is a triangular elevation, extending radially, in longitudinal section in axial direction, on a cylindrical part of the connector inner part.

In the case of snap connections, the elasticity of the materials, in most cases plastics or spring steel, is exploited to join two components. An assembly part deforms elastically and then interlocks releasably or unreleasably with a counter holder, wherein the counter holder can also be designed as an elastically deformable assembly part.

The connector housing preferably has two openings as counter holder, into each of which a locking tab engages, wherein the locking tabs are arranged on opposite sides of the connector inner part. The opposing arrangement increases the security and precision of the connection.

The connector inner part preferably comprises a jacket which houses at least a ferrule holder, a spring and the ferrule.

The connector housing preferably comprises at least one means for increasing the deformability of the connector housing when the connector inner part is being inserted, wherein the means for increasing the deformability of the connector housing is preferably a slit introduced from the rear side into at least one of the side walls, preferably both side walls. These measures minimize the force to be applied for the connection and reduce the risk of damage to the housing.

Preferably, it is further provided that two connector inner parts are housed in one connector housing. The connector housing preferably comprises at least one locking device for locking the connection with a receptacle.

BRIEF DESCRIPTION OF THE DRAWINGS

An embodiment example of the present invention is explained in more detail in the following with reference to the attached drawings. There are shown in:

FIG. 1 an embodiment example of a connector according to aspects of the invention in a three-dimensional view;

FIG. 2 the embodiment example according to FIG. 1 in a plan view;

FIG. 3 a representation of the embodiment example according to FIGS. 1 and 2 in an exploded view;

FIG. 4 a longitudinal section through a jacket of the connector inner part.

DETAILED DESCRIPTION OF THE PREFERRED EMBODIMENTS OF THE INVENTION

Reference is first made to FIGS. 1 and 2. These show an embodiment example of a connector according to the invention by means of a connector for two optical fibres. The connector comprises a connector housing 1 which has the dimensions of an R345 connector. The connector housing 1 comprises a locking device 2 with a locking edge 3 which is formed in a spring-elastic manner as a plastic component in the manner of an integral hinge and, with the aid of an actuation bar 4, can be pressed onto the housing in order to unlock a connection with a receptacle. Two ferrules, numbered 6a and 6b, project from the connector housing 1 at one end 5 of the connector housing 1.

The ferrules are each part of connector inner parts 7a, 7b, such as are represented for example in FIG. 3. The connector inner parts 7a, 7b are each accommodated in housing openings 27 of the connector housing 1. The connector inner parts 7a, 7b are explained in more detail below using as an example the connector inner part 7a. The connector inner part 7 comprises, in addition to the ferrule 6, already named above, a ferrule holder 8 which has a continuous stepped bore 9, wherein the ferrule 6 is fitted into the bore with the largest diameter of the stepped bore 9 and a glass fibre cable, not shown, is led from the other side through the stepped bore 9 of the ferrule holder 8 into the ferrule 6. Both the ferrule 6 and the glass fibre cable are glued to the ferrule holder 8. The connector inner part 7 furthermore comprises a spring 10 which is supported on one side on a circumferential ring 11 of the ferrule holder 8 and on the other side is supported on a shoulder 26 of a jacket 12. The jacket 12 has a substantially cylindrical outer contour. The ring 11 of the ferrule holder 8 has on its outer periphery a polygonal contour, the jacket 12, as shown in FIG. 3, correspondingly has a zone 14 with a polygonal cross section corresponding to that of the polygon 13. The two polygons 13, 14 serve to secure the ferrule holder 8 from rotation relative to the jacket 12. In the installed state, the ferrule holder 8 projects, as can be seen in the connecter inner part 7b not shown in exploded view, from the jacket 12 roughly as far as a ring 15 on the side on which the ferrule 6 is arranged. The jacket 12 comprises a locking tab 16 and a locking tab 17 which are arranged opposite each other relative to the rotation axis of the jacket 12. The locking tabs 16, 17 are triangular elevations in longitudinal section, which form an edge 18 on the side facing away from the ferrule. In the installed state in the housing 1, the locking tabs 16, 17 each lie in openings 19 of the connector housing 1. Upon a movement in which it is attempted to pull the connector inner part 7 out of the connector housing 1, the edge 18 strikes a rear contact surface 20 of the opening 19. The locking tab 17, together with the recess 19, forms a snap connection. When creating the connection, the connector housing 1 is pushed apart in the direction of the arrows 22 and 23 on the rear side 21 facing away from the end side 5. To make this possible, a slit 24 is introduced from the rear side 21 into each of the side walls 25 in this area.

The embodiment example of the invention described above relates to a connector with the outer dimensions of an RJ45 connector in which two optical fibres are housed by means of two connector inner parts 7a, 7b. However, it is also possible here to house only one optical fibre by means of a connector inner part 7. Furthermore, it is possible to integrate additional connection means, such as e.g. electrical connections, such as are named e.g. in EP 1 199 587, into the connector.

ITEM NUMBER LISTING 1 connector housing
2 locking device
3 locking edge
4 actuation bar
5 end side
6a, 6b ferrule
7a, 7b connector inner part
8 ferrule holder
9 stepped bore
10 spring
11 ring
12 jacket
13 polygon exterior
14 polygon interior
15 ring
16 locking tab
17 locking tab
18 edge
19 opening
20 rear contact surface
21 rear side
22 arrow
23 arrow
24 slit
25 side wall
26 shoulder
27 housing opening

The invention claimed is:

1. A connector for termination of optical transmission media comprising:
a connector housing and at least one connector inner part arranged therein, which comprises a ferrule with a bore for receiving the optical transmission media,
wherein the ferrule is fixedly connected to the connector inner part,
wherein the connector inner part is joined to the connector housing by a snap connection,
wherein the connector housing has at least one opening into which a locking tab engages when in an installed position,
wherein the locking tab is a triangular elevation, extending radially, in longitudinal section in an axial direction, on a cylindrical part of the connector inner part.

2. The connector according to claim 1, wherein the connector housing has two openings into each of which a locking tab engages, wherein the locking tabs are arranged on opposite sides of the connector inner part.

3. The connector according to claim 1, wherein the connector inner part comprises a jacket which houses at least a ferrule holder, a spring and the ferrule.

4. The connector according to claim 1, wherein the connector housing comprises at least one means for increasing a deformability of the connector housing when the connector inner part is being inserted.

5. The connector according to claim 4, wherein the means for increasing the deformability of the connector housing is a slit introduced from a rear side into at least one side wall.

6. The connector according to claim 1, wherein two connector inner parts are housed in one connector housing.

7. The connector according to claim 1, wherein the connector housing comprises at least one locking device for locking the connection with a receptacle.

* * * * *